Figure 1:
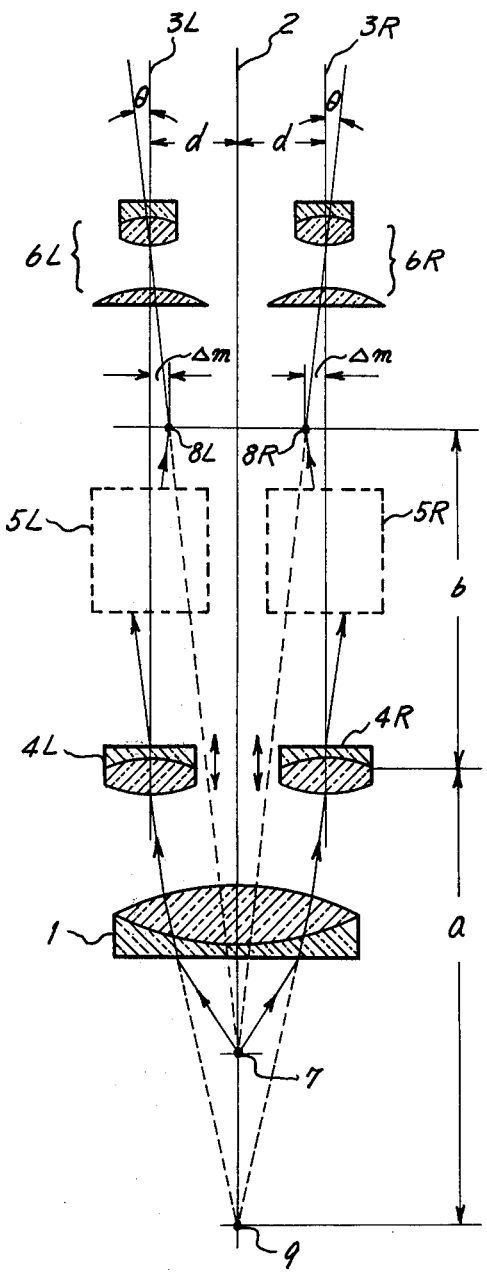

United States Patent [19]

Abe et al.

[11] 4,009,930

[45] Mar. 1, 1977

[54] BINOMIAL MICROSCOPE

[75] Inventors: Kuniomi Abe, Kobe; Yuji Maekawa, Nishinomiya, both of Japan

[73] Assignee: Konan Camera Research Institute, Nishinomiya, Japan

[22] Filed: Oct. 20, 1975

[21] Appl. No.: 623,575

[30] Foreign Application Priority Data

Apr. 23, 1975 Japan .......................... 50-55922[U]

[52] U.S. Cl. .................................. 350/35; 350/139
[51] Int. Cl.² ......................................... G02B 21/22
[58] Field of Search ............... 350/33, 35, 139, 75, 350/76, 145

[56] References Cited

UNITED STATES PATENTS 3,434,772  3/1969  Fogle ..................................... 350/35

*Primary Examiner*—Edward S. Bauer
*Assistant Examiner*—Matthew W. Koren
*Attorney, Agent, or Firm*—Eugene E. Geoffrey, Jr.

[57] ABSTRACT

A binomial microscope having two parallel optical systems each including an objective lens, an erect prism and an ocular lens and wherein means are provided for moving each objective in a direction parallel to its optical axis to position the observed image in the vicinity of the object being observed.

1 Claim, 3 Drawing Figures

U.S. Patent  Mar. 1, 1977  4,009,930

BINOMIAL MICROSCOPE

This invention relates to an improved binomial microscope, and more specifically to an improved structure thereof.

There are two types of binomial microscopes, one having a pair of microscopes arranged to have their optical axes intersecting in the vicinity of the object, while the other is arranged to have parallel optical axes. The former type has the disadvantage in that it is difficult to assemble though the parallax between the both eyes is unchanged even in case of repeating alternation of direct observation by the naked eyes and microscopic observation. Contrarily, the latter one has the disadvantage that the observer is fatigued by the parallax between the both eyes varying between the both modes of observation, although it can be easily assembled.

Accordingly, an object of this invention is to provide an improved binomial microscope which can be easily assembled and also can form an observed image in the vicinity of the object to be observed.

This object can be attained in accordance with this invention by utilizing a microscope which comprises an auxiliary objective arranged in the rear of the object to be observed and a pair of optical systems having substantially parallel optical axes and being arranged in the rear of the auxiliary objective and the each optical system includes an objective, an erect prism, an ocular and an adjusting mechanism for moving the objective in a direction parallel to the optical axis.

These and other objects and advantages of this invention will be described in detail hereinunder with reference to the accompanying drawings.

Figure 2A:
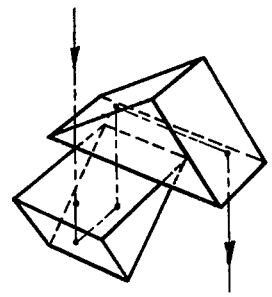
Figure 2B:
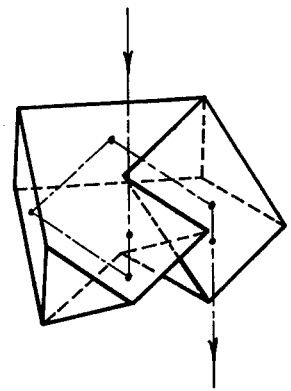

In the drawings:

FIG. 1 is a schematic diagram representing a structural configuration of an embodiment of binomial microscope according to this invention; and FIGS. 2 (a) and 2 (b) are perspective views representing two examples of the erect prisms of FIG. 1.

In FIG. 1, like reference numerals are used to denote corresponding structural components and suffixes L and R are added thereto for distinguishing the lefthand and righthand optical systems. The binomial microscope in the drawing includes an auxiliary objective 1 having an optical axis 2 at the front end. Along a pair of optical axes 3L and 3R which are parallel to and symmetrical about the optical axis 2, there are a pair of optical systems respectively comprising objectives 4L and 4R, erect prisms 5L and 5R and oculars 6L and 6R arranged in that order as shown.

Though the erect prisms 5L and 5R are shown as dashed blocks in the drawing, they may be of any type of erect prism assembly which is well known in this field. FIGS. 2 (a) and 2 (b) represent two typical examples of erect prism, which are known as Porro Types I and II respectively.

An object 7 to be observed is placed on the axis 2 and is imaged by the auxiliary objective 1 and the erect prisms 5L and 5R in planes 8L and 8R respectively as real images deviating by $\Delta m$ from the optical axes 3L and 3R. The images are observed through the oculars 6L and 6R. Assuming now the declination angles of the real images 8L and 8R is $\theta$ and the focal length of the oculars 6L and 6R is $f_6$, then $$\Delta m = f_6 \tan \theta \tag{1}$$

since the real images 8L and 8R are generally formed closely to the focal planes of the oculars 6L and 6R. Assuming that a is the distance between the objectives 4L and 4R and a virtual image 9 of the object 7 through the auxiliary objective 1, b is the optical distance between the objective 4L and 4R and the real image 8L and 8R and $f_4$ is the focal length of the objectives 4L and 4R, then $$1/f_4 = 1/a + 1/b \tag{2}$$

If d is the distance between both references optical axes 3L and 3R, then $$d/a = \Delta m/b \tag{3}$$

Cancelling $\Delta m$ and a from Equations (1), (2), and (3), then $$\tan \theta = db/f_4 f_6 - d/f_6$$

This equation teaches that the declination angle $\theta$ is changed by changing the distance b between the objectives 4L and 4R and the real images 8L and 8R, that is, by moving the objectives 4L and 4R in the axial direction as shown by arrows. In accordance with this teaching, the binomial microscope of this invention includes mechanisms for moving the objectives 4L and 4R along the optical axes 3L and 3R respectively. By adjusting the movement of the objectives 4L and 4R, the observed image can be formed in the vicinity of the object 7 to be observed.

What is to be claimed:

1. A binomial microscope comprising an auxiliary objective lens and a pair of optical systems having substantially parallel optical axes and being arranged in the rear of said auxiliary objective, each of said optical systems including an objective lens, an erect prism and an ocular, wherein said optical system further includes means for moving the last said objective lens in a direction substantially parallel to said optical axis while maintaining the remaining optical elements in fixed positions.

* * * * *